United States Patent

Takahashi et al.

[11] Patent Number: 5,785,020
[45] Date of Patent: Jul. 28, 1998

[54] COMBUSTION STATE DETECTING APPARATUS FOR AN INTERNAL-COMBUSTION ENGINE

[75] Inventors: Yasuhiro Takahashi; Wataru Fukui, both of Tokyo, Japan

[73] Assignee: Mitsubishi Denki Kabushiki Kaisha, Tokyo, Japan

[21] Appl. No.: 890,671

[22] Filed: Jul. 9, 1997

[30] Foreign Application Priority Data

Feb. 19, 1997 [JP] Japan ................. 9-035107

[51] Int. Cl.[6] ................................................ F02P 5/14
[52] U.S. Cl. ................................................ 123/425
[58] Field of Search ............................ 123/425, 494, 123/416; 73/35; 324/388

[56] References Cited

U.S. PATENT DOCUMENTS 5,263,452  11/1993  Ohsawa et al. .................. 123/425
5,425,339   6/1995  Fukui ................................ 123/416
5,676,113  10/1997  Johansson et al. .............. 123/425
5,692,474  12/1997  Yamauchi et al. ............... 123/425
5,694,900  12/1997  Morita et al. .................... 123/425

*Primary Examiner*—Raymond A. Nelli
*Attorney, Agent, or Firm*—Sughrue, Mion, Zinn, Macpeak & Seas, PLLC

[57] ABSTRACT

A combustion state detecting apparatus for an internal-combustion engine permits an improved signal-to-noise ratio of a knocking signal with a resultant improved controllability without adding to the load on an electronic control unit (ECU). The combustion state detecting apparatus is equipped with: a knocking signal processing circuit 20 which generates a knocking signal (K) according to an ionic current detection signal (Ei); and an ECU (2A) which detects the combustion state at a spark plug according to the ionic current detection signal and the knocking signal.

12 Claims, 9 Drawing Sheets

5,785,020

1

COMBUSTION STATE DETECTING APPARATUS FOR AN INTERNAL-COMBUSTION ENGINE

BACKGROUND OF THE INVENTION

1. Field of the Invention

The present invention relates to a combustion state detecting apparatus for an internal-combustion engine, which apparatus controls ignition timing and the amount of fuel injection by detecting the combustion state of the internal-combustion engine by detecting the changes in the quantity of ions which are produced at the time of combustion in the internal-combustion engine and, more particularly, to a combustion state detecting apparatus for an internal-combustion engine, which apparatus is capable of detecting the occurrence of knocking with high reliability to achieve optimum ignition timing without adding load to an electronic control unit, i.e. a microcomputer.

2. Description of Related Art

Generally, in an internal-combustion engine, the air and fuel, i.e. a fuel-air mixture, which has been introduced into the combustion chamber of each cylinder is compressed as a piston moves up, and high voltage is applied to a spark plug in the combustion chamber to generate an electric spark at the spark plug so as to burn the compressed fuel-air mixture; the explosive energy produced at that time is taken out as the force which pushes the piston down and it is converted to a rotary output.

When the combustion takes place in the combustion chamber in the foregoing combustion and expansion stroke, the molecules in the combustion chamber are ionized. Therefore, applying high voltage to the electrodes for detecting ionic current, which are installed in the combustion chamber, immediately after the combustion and expansion stroke causes ions with electric charges to move in the form of ionic current.

It is known that the ionic current sensitively reacts to the combustion state in the combustion chamber with a resultant change, making it possible to determine a combustion state such as a misfire or knocking in a cylinder by detecting the state of the ionic current, including the peak value thereof.

Based on the above, there has been proposed an apparatus which employs a spark plug as the electrode for detecting ionic current to detect the occurrence of knocking of an internal-combustion engine according to the level of the ionic current detected over a predetermined period of time as described, for example, in Japanese Unexamined Patent Publication No. 5-149230.

FIG. 11 is a block diagram that schematically illustrates the basic configuration of a conventional combustion state detecting apparatus for an internal-combustion engine; it shows an example wherein high voltage is distributed to the spark plug of each cylinder via a distributor.

FIG. 12 is a timing chart illustrative of the operational waveforms of the voltage signals in FIG. 11; it shows the waveforms of the ionic current and knocking signals observed when knocking occurs and when normal combustion takes place.

In FIG. 11, a crankshaft of an internal-combustion engine, i.e. an engine, not shown, is provided with a crank angle sensor 1; the crank angle sensor 1 issues a crank angle signal SGT composed of pulses corresponding to engine speed.

Each pulse edge of the crank angle signal SGT indicates the crank angle reference position of each cylinder, not shown, of the internal-combustion engine. The crank angle signal sGT is supplied to an electronic control unit (ECU) 2 constituted by a microcomputer and employed for various types of control arithmetic operations.

The ECU 2 issues an ignition signal P for a power transistor TR driving an ignition coil 4, a fuel injection signal Q for an injector 5 of each cylinder, and driving signals for various actuators 6 including a throttle valve and ISC valve in accordance with the crank angle signal SGT received from the crank angle sensor 1 and the operational information received from various sensors 3 including a well-known intake sensor and a throttle opening sensor.

The ignition signal P issued from the ECU 2 is applied to the base of the power transistor TR to turn ON/OFF the power transistor TR.

The power transistor TR cuts off the supply of primary current i1 flowing into a primary winding 4a of the ignition coil 4 to boost primary voltage V1 so as to generate secondary voltage V2 of high voltage, e.g. a few tens of kilovolts, for ignition from a secondary winding 4b of the ignition coil 4.

A distributor 7 connected to the output terminal of the secondary winding 4b distributes and applies the secondary voltage V2 to spark plugs 8a through 8d in each cylinder so as to generate discharge sparks in the combustion chamber of the cylinder under ignition control, thereby burning a fuel-air mixture.

A series circuit comprised of a diode D1, a current limiting resistor R1, and current limiting zener diode DZ and diode D2 is provided between one end of the primary winding 4a and the ground to constitute a charging path for the biasing power supply, i.e. a capacitor to be discussed later, for detecting ionic current.

A capacitor 9 connected in parallel to both ends of the zener diode DZ is charged to a predetermined voltage by charging current in order to function as the power supply for detecting ionic current; it discharges immediately after ignition control to let ionic current i flow.

Diodes 11a through 11d provided between one end of the capacitor 9 and one end of the spark plugs 8a through 8d, and a resistor R2 inserted between the other end of the capacitor 9 and the ground make up, together with the capacitor 9, an ionic current detecting means through which the ionic current i flows.

The resistor R2 converts the ionic current i to a voltage and supplies an ionic current detection signal Ei to the ECU 2.

A filter circuit 13 extracts a knocking frequency component from the ionic current detection signal Ei and issues a knocking signal K indicative of the occurrence of knocking in the internal-combustion engine.

A waveform shaping circuit 14 compares the knocking signal K with a predetermined waveform shaping level Kr to shape it to a pulse waveform which is supplied as a knocking pulse KP to the ECU 2.

As previously mentioned, the ECU 2 computes the control parameters for the internal-combustion engine and also detects the combustion state at the spark plugs 8a through 8d according to the ionic current detection signal Ei and the knocking pulse KP to correct the control parameters.

Referring now to FIG. 12, the operation of the conventional combustion state detecting apparatus for an internal-combustion engine shown in FIG. 11 will be described.

First, the crank angle sensor 1 outputs the crank angle signal SGT shown in FIG. 12 according to the rotation of the internal-combustion engine. The ECU 2 outputs various driving signals including the ignition signal P for turning ON/OFF the power transistor TR according to the crank angle signal SGT indicative of the crank angle position of each cylinder and the operational state signals received from various sensors 3.

The power transistor TR turns ON when the ignition signal P is at high level and it allows the primary current i1 to flow through the primary winding 4a of the ignition coil 4; it cuts off the primary current i1 to the ignition coil 4 when the ignition signal P is switched from high to low level.

At this time, the primary voltage V1 is generated at the primary winding 4a, thereby charging the capacitor 9 through a charging current path composed of the diode D1, the resistor R1, and the diode D2.

The charging of the capacitor 9 is completed when the charging voltage of the capacitor 9 becomes equal to the reverse breakdown voltage of the zener diode DZ.

When the primary voltage V1 appears at the primary winding 4a, the secondary winding 4b of the ignition coil 4 develops the secondary voltage V2 of a few tens of kilovolts; the secondary voltage V2 is applied to the spark plugs 8a through 8d of each cylinder via the distributor 7 so as to cause spark discharge to burn the fuel-air mixture.

When the fuel-air mixture burns, ions are produced in the combustion chamber of the cylinder, so that the ionic current i flows, the charging voltage of the capacitor 9 being the power supply.

For example, when the fuel-air mixture burns at the spark plug 8a, the ionic current i flows through a path constituted by the capacitor 9, the diode 11a, the spark plug 8a, the ground, the resistor R2, and the capacitor 9 in the order in which they are listed. At this time, the resistor R2 converts the ionic current i to voltage so as to supply it as the ionic current detection signal Ei to the ECU 2.

The filter circuit 13 and the waveform shaping circuit 14 output the knocking pulse KP indicative of the occurring state of knocking in accordance with the ionic current detection signal Ei.

The ECU 2 determines the combustion state and the presence of knocking in accordance with the ionic current detection signal Ei and the knocking pulse KP; if it determines that a misfire has happened, then it cuts off the supply of fuel, or if it determines that knocking has occurred, then it delays the ignition timing to restrain the knocking.

Thus, whether the combustion state is good or bad and whether knocking has occurred are reflected on the control parameters to ensure optimized control of the ignition timing, the amount of fuel injection, etc., thereby enabling optimum, maximum engine output torque to be obtained.

However, at the rise timing and the fall timing of the ignition signal P, i.e. at the time of energizing and de-energizing the ignition coil 4, an instantaneous noise signal En is output as the ionic current detection signal Ei as illustrated in FIG. 12.

The noise signal En directly turns into a knocking signal Kn and a knocking pulse KPn which are supplied to the ECU 2; therefore, the ECU 2 erroneously determines that knocking has occurred because of the knocking pulse KPn derived from the noise signal En and unnecessarily delays the ignition timing.

Thus, the conventional combustion state detecting apparatus for an internal-combustion engine has been posing a problem in that, although it determines the presence of knocking according to the ionic current i, it provides no measures against the noise signal En superimposed on the ionic current i at the time of ignition control, making it impossible to accurately detect the occurrence of knocking in the internal-combustion engine.

There has been another problem in that setting an effective period of the knocking signal K or the knocking pulse KP during the arithmetic processing performed by the ECU 2 adds load to the ECU 2 implementing the arithmetic processing, adversely affecting the controlling operation, which is the major function of the ECU 2.

SUMMARY OF THE INVENTION

The present invention has been made with a view toward solving the problems described above, and it is an object of the invention to provide a combustion state detecting apparatus for an internal-combustion engine, which apparatus renders a knocking signal effective or ineffective according to the level of the ionic current detection signal to restrict the period during which the knocking signal can be issued, thereby achieving improved signal-to-noise ratio of the knocking signal and improved controllability without adding to the load on the arithmetic processing implemented by an ECU.

To this end, according to the present invention, there is provided a combustion state detection apparatus for an internal-combustion engine, which is equipped with: an ignition coil for generating high voltage for ignition; a spark plug for igniting a fuel-air mixture in a cylinder of the internal-combustion engine by discharging under the application of the high voltage for ignition; an ionic current detecting circuit which includes biasing means for applying a bias voltage to the spark plug and detects, as an ionic current detection signal, the ionic current corresponding to the quantity of ions produced in the cylinder immediately after the combustion of the fuel-air mixture; a knocking signal processing circuit which generates a knocking signal indicative of the occurrence of knocking in the internal-combustion engine according to the ionic current detection signal; and an ECU which computes control parameters for the internal-combustion engine and also detects the combustion state at the spark plug according to the ionic current detection signal and the knocking signal; wherein the knocking signal processing circuit includes filtering means for extracting a frequency band, which corresponds to the knocking of the internal-combustion engine, from the ionic current detection signal, an enabled/disabled detection determining means for issuing an enabled/disabled detection signal indicative of whether the knocking signal is detectable according to the ionic current detection signal, and knocking signal switching means for rendering the output of the knocking signal effective only when the enabled/disabled detection signal indicates an enabled detection state.

In a preferred form of the present invention, the enabled/disabled detection determining means of the combustion state detecting apparatus for an internal-combustion engine includes: a comparator circuit for comparing the ionic current detection signal with a predetermined reference level; and a timer processing circuit which issues the enabled/disabled detection signal according to a comparison result given by the comparator circuit when the ionic current detection signal continuously exceeds the reference level for a predetermined time.

In another preferred form of the present invention, the knocking signal switching means of the combustion state detecting apparatus for an internal-combustion engine is composed of a gate circuit inserted between the ionic current detecting means and the filtering means; it supplies the ionic current detection signal to the filtering means when the enabled/disabled detection signal indicates the enabled detection state, whereas it prohibits the input of the ionic current detection signal to the filtering means when the enabled/disabled detection signal indicates a disabled detection state.

In yet another preferred form of the present invention, the knocking signal switching means of the combustion state detecting apparatus for an internal-combustion engine is composed of a gate circuit provided at the output end of the filtering means; it renders the output of the knocking signal effective when the enabled/disabled detection signal indicates the enabled detection state, whereas it prohibits the output of the knocking signal when the enabled/disabled detection signal indicates the disabled detection state.

In still another preferred form of the present invention, the knocking signal switching means of the combustion state detecting apparatus for an internal-combustion engine is composed of a logical operation means provided at the output end of the filtering means; it outputs the logical product of the knocking signal and the enabled/disabled detection signal as a final knocking signal.

In another preferred form of the present invention, the knocking signal switching means of the combustion state detecting apparatus for an internal-combustion engine is composed of filtering characteristic changing means provided in the filtering means; it lowers the output level of the frequency band which corresponds to knocking when the enabled/disabled detection signal indicates the disabled detection state.

In a preferred form of the present invention, the knocking signal processing circuit of the combustion state detecting apparatus for an internal-combustion engine includes waveform shaping means provided at the output end of the filtering means; the waveform shaping means compares the knocking signal with a predetermined waveform shaping level to turn it into a knocking pulse which is applied to the ECU.

In another preferred form of the present invention, the ECU of the combustion state detecting apparatus for an internal-combustion engine includes circuit failure determining means which determines a failure of an input circuit of the ECU according to at least one of the enabled/disabled detection signal and the knocking pulse; the input circuit includes the knocking signal processing circuit and a signal path connecting the knocking signal processing circuit and the ECU.

In a preferred form of the present invention, the knocking signal processing circuit of the combustion state detecting apparatus for an internal-combustion engine includes an output interface circuit for outputting the knocking pulse at a voltage level between the line voltage of the ECU and the ground; the ECU includes an input interface circuit having an input terminal to which the knocking pulse is applied; the voltage of the input terminal is set to a predetermined level which is different from the voltage level of the knocking pulse if the input circuit has failed; and the circuit failure determining means determines at least one of a disconnection failure and a ground fault of the input circuit according to the voltage at the input terminal.

In yet another preferred form of the present invention, the input interface circuit of the combustion state detecting apparatus for an internal-combustion engine includes a resistor inserted between the input terminal and the power supply of the ECU, a reference voltage generating circuit for generating the reference voltage between the high level voltage of the knocking pulse and the line voltage, and a comparator circuit for comparing the voltage at the input terminal with the reference voltage; the voltage at the input terminal is set to a value lower than the line voltage when the input circuit is sound, whereas it is set to the line voltage if the input circuit has incurred a disconnection failure; and the circuit failure determining means determines the disconnection failure of the input circuit according to the voltage at the input terminal and the comparison result given by the comparator circuit.

In still another preferred form of the present invention, the output interface circuit of the combustion state detecting apparatus for an internal-combustion engine includes a resistor inserted between the output terminal of the knocking pulse and the ground; the input interface circuit includes a reference voltage generating circuit for generating the reference voltage between the low level voltage of the knocking pulse and the ground, and a comparator circuit for comparing the voltage at the input terminal with the reference voltage; the voltage at the input terminal is set to a value higher than the potential of the ground when the input circuit is sound, whereas it is set to the potential of the ground if the input circuit has incurred a ground fault; and the circuit failure determining means determines the ground fault of the input circuit according to the voltage at the input terminal and the comparison result given by the comparator circuit.

In another preferred form of the present invention, the circuit failure determining means of the combustion state detecting apparatus for an internal-combustion engine decides that the knocking signal processing circuit has failed if the enabled/disabled detection signal is not received for a predetermined period of time.

DESCRIPTION OF THE PREFERRED EMBODIMENTS

First Embodiment

A first embodiment of the present invention will be described in conjunction with accompanying drawings.

Figure 1:
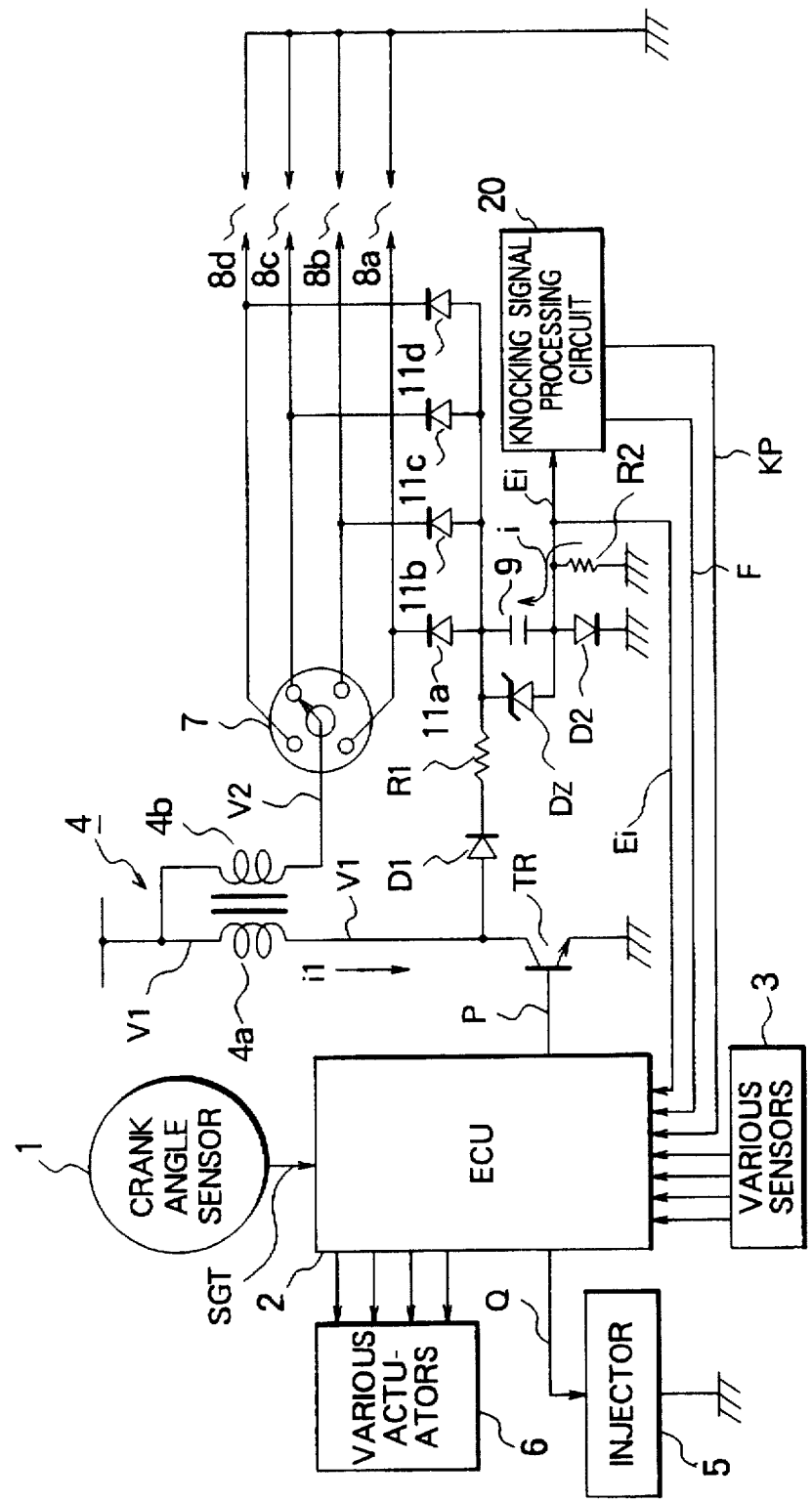
FIG. 1 is a configuration diagram schematically showing a first embodiment of the present invention.
Figure 4:
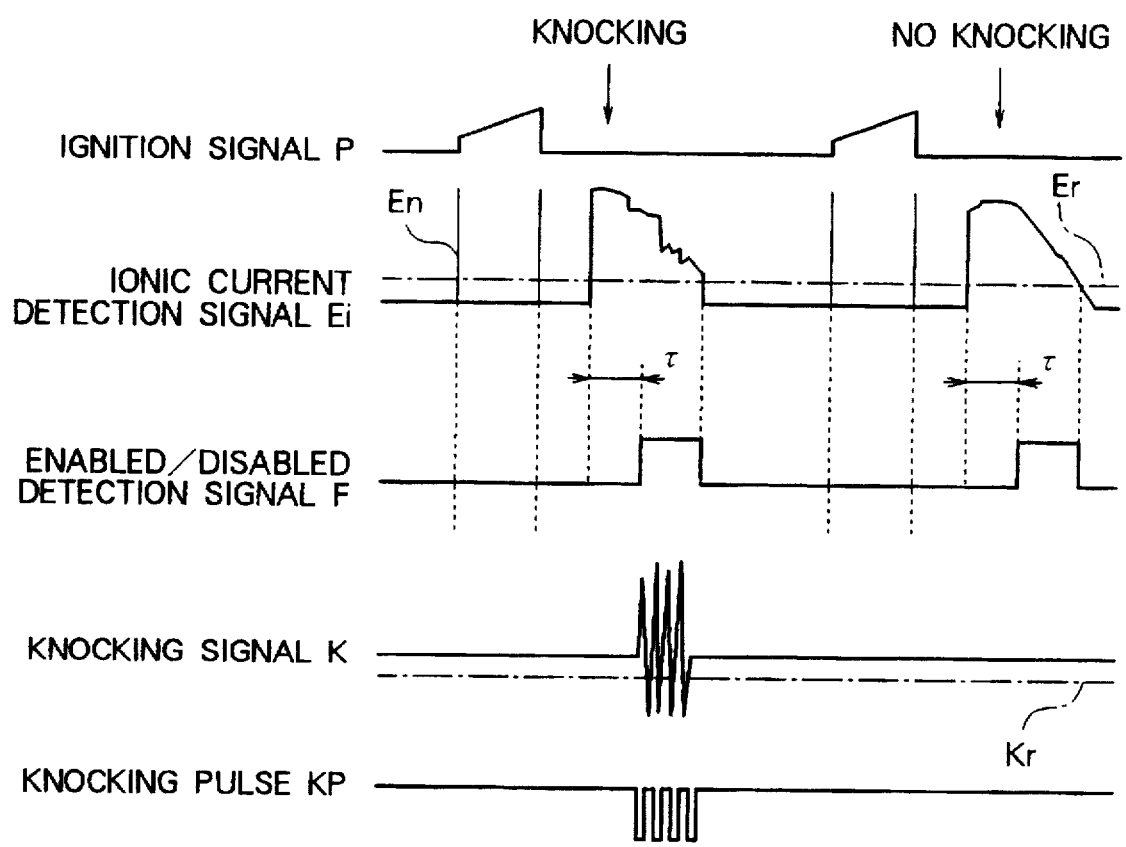
FIG. 4 is a timing chart for describing the operation of the first embodiment of the present invention.

FIG. 1 is a block diagram schematically showing the basic configuration of the first embodiment of the invention; FIG. 4 is a timing chart illustrating the operational waveforms of respective signals (voltages) in FIG. 1.

Figure 11:
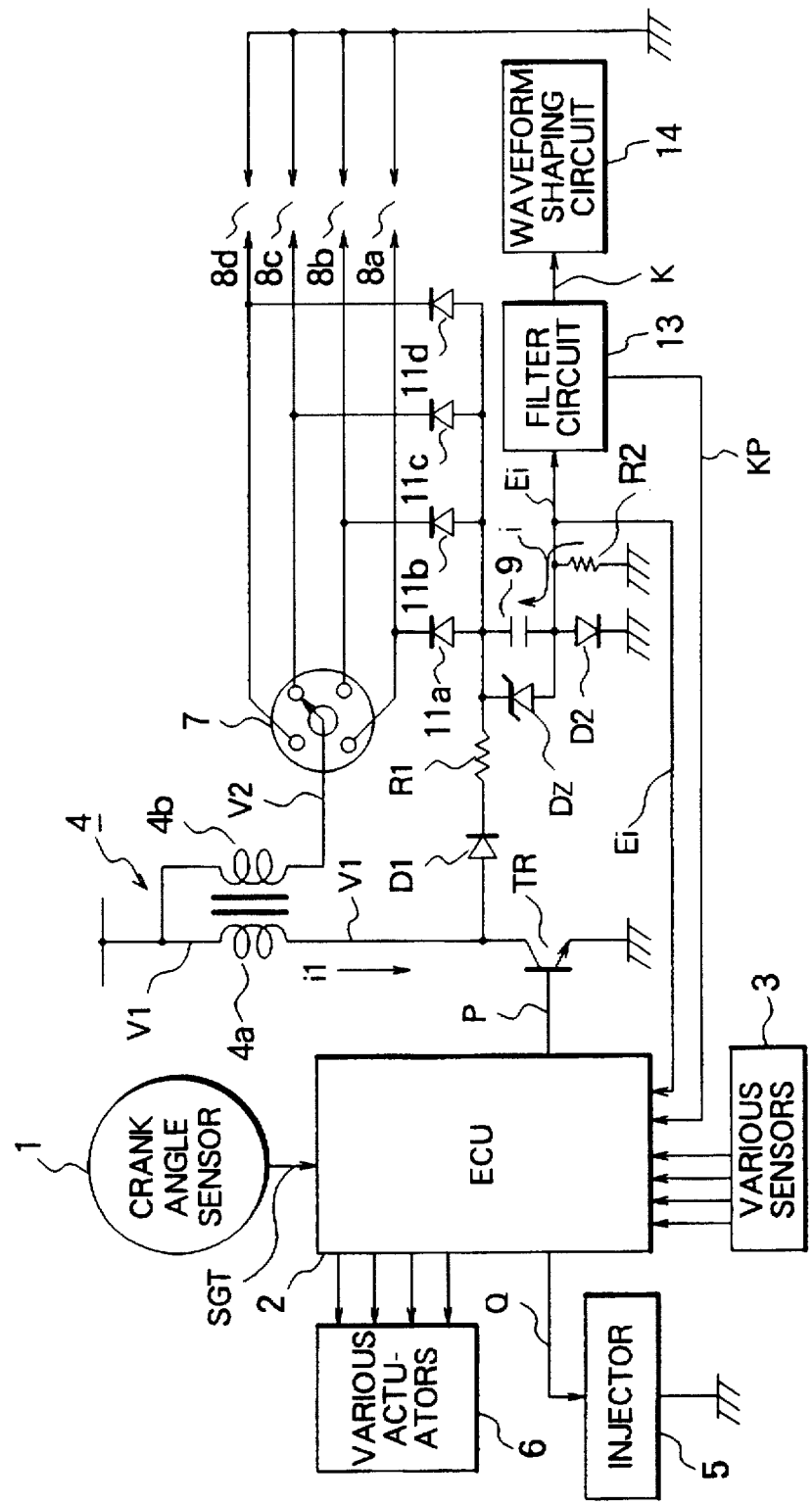
FIG. 11 is a configuration diagram schematically showing a conventional combustion state detecting apparatus for an internal-combustion engine.
Figure 12:
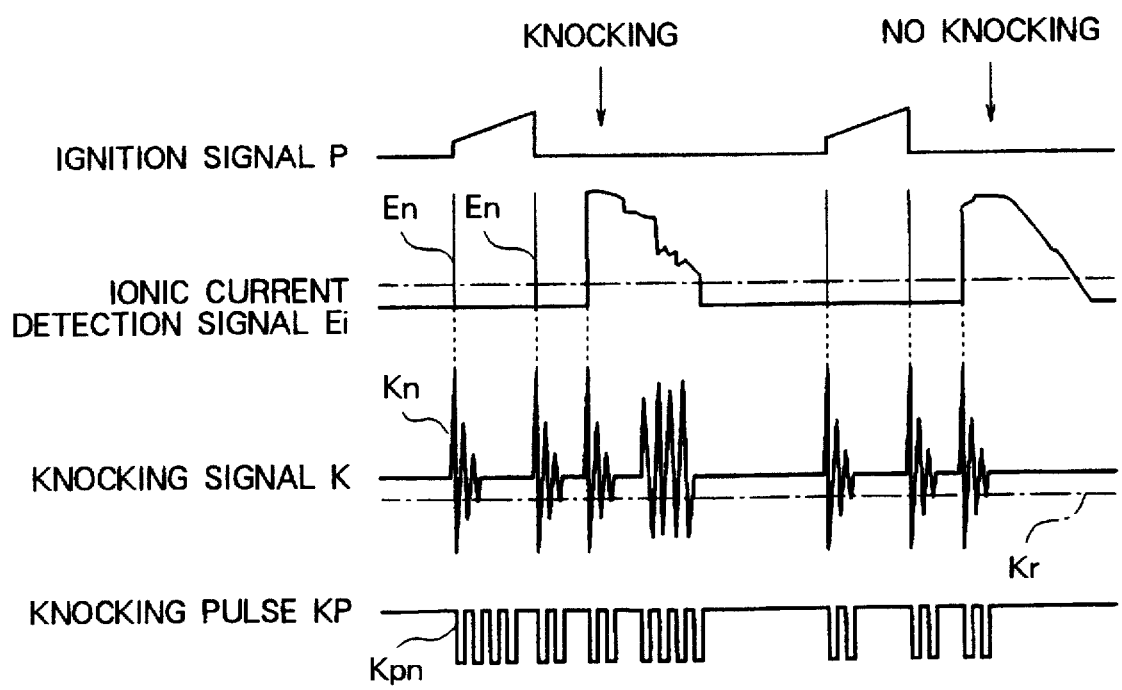
FIG. 12 is a timing chart for describing the operation of the conventional combustion state detecting apparatus for an internal-combustion engine.

In the drawings, like components as those shown in FIG. 11 will be assigned like reference numerals and the detailed description thereof will be omitted.

In FIG. 1, a knocking signal processing circuit 20 is connected to one end of a resistor R2 constituting an ionic current detecting circuit.

The knocking signal processing circuit 20 generates a enabled/disabled detection signal F indicative of the enabled detection of knocking and a knocking pulse KP indicative of the occurrence of knocking of an internal-combustion engine in accordance with an ionic current detection signal Ei, and supplies them to an ECU 2A.

The ECU 2A detects the combustion states at spark plugs 8a through 8d according to the ionic current detection signal Ei, the enabled/disabled detection signal F, and the knocking pulse KP based on a knocking signal K, and it also detects the presence of knocking of the internal-combustion engine.

Figure 2:
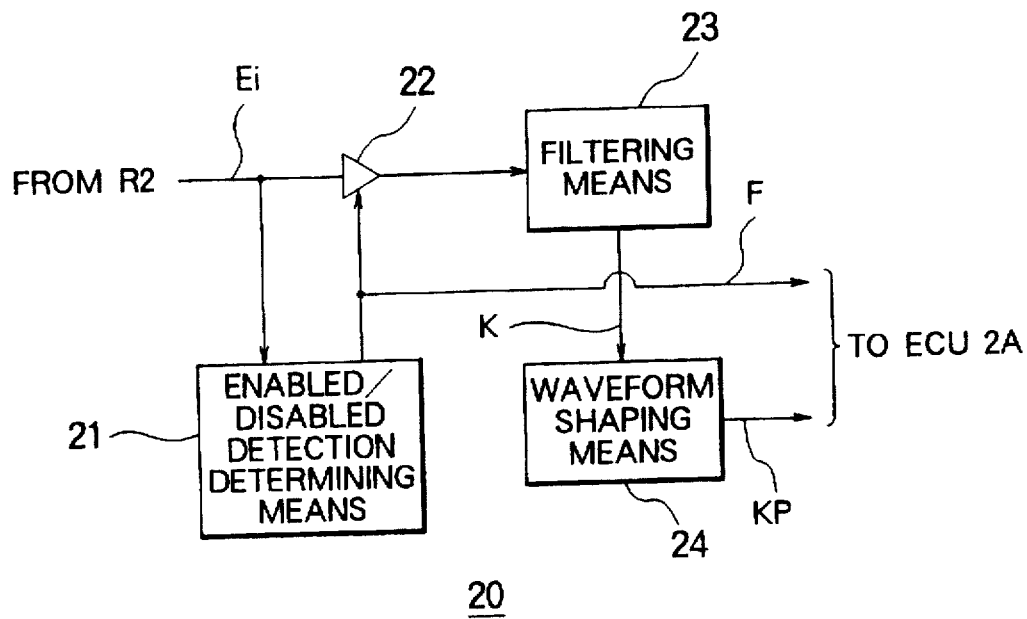
FIG. 2 is a functional block diagram illustrating a specific configuration example of a knocking signal processing circuit shown in FIG. 1.

FIG. 2 is a functional block diagram illustrating a specific configuration example of the knocking signal processing circuit 20 shown in FIG. 1. In FIG. 2, a filtering means 23 and a waveform shaping means 24 correspond to the filter circuit 13 and the waveform shaping circuit 14, respectively, shown in FIG. 11.

The filtering means 23 extracts, as the knocking signal K, the frequency band corresponding to the knocking of the internal-combustion engine from the ionic current detection signal Ei; and the waveform shaping means 24 converts the knocking signal K to the knocking pulse KP which is supplied to the ECU 2A.

The knocking signal processing circuit 20 includes an enabled/disabled detection determining means 21 inserted at the input end of the filtering means 23 and a gate circuit 22.

The enabled/disabled detection determining means 21 issues a enabled/disabled detection signal F indicative of the readiness for detecting the knocking signal K according to the level of the ionic current detection signal Ei.

The gate circuit 22 which is inserted between the resistor R2 and the filtering means 23 constitutes a knocking signal switching means; it allows the ionic current detection signal Ei to go through the filtering means 23 so as to render the output of the knocking signal K effective only when the enabled/disabled detection signal F indicates the enabled detection state, i.e. high level, whereas it prevents the ionic current detection signal Ei from going through the filtering means 23 when the enabled/disabled detection signal F indicates the disabled detection state, i.e. low level.

Figure 3:
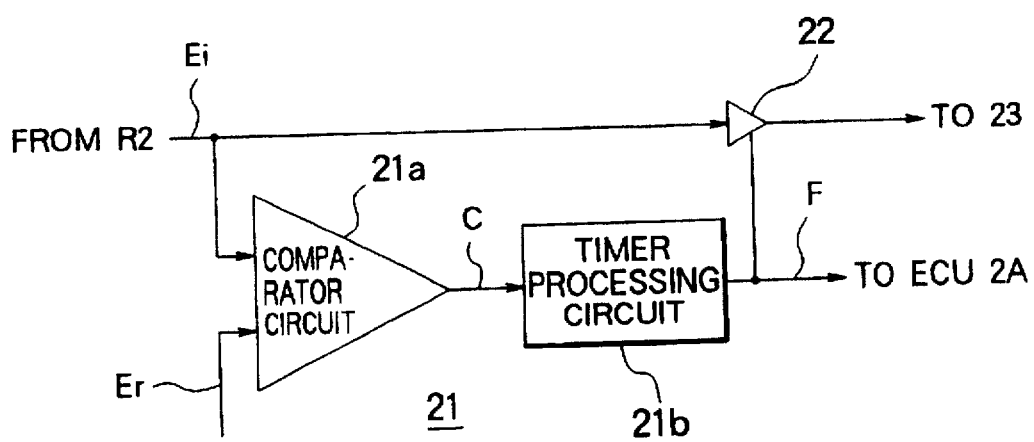
FIG. 3 is a circuit block diagram illustrative of a specific example of an enabled/disabled detection determining means shown in FIG. 2.

FIG. 3 is a configuration diagram illustrating a specific example of the enabled/disabled detection determining means 21 shown in FIG. 2.

In FIG. 3, the enabled/disabled detection determining means 21 includes a comparator circuit 21a which compares the ionic current detection signal Ei with a predetermined reference level Er, and a timer processing circuit 21b which issues the enabled/disabled detection signal F when the ionic current detection signal Ei continuously exceeds the reference level Er for a predetermined time τ according to a comparison result C given by the comparator circuit 21a.

Referring to the timing chart of FIG. 4, the operation of the first embodiment of the invention shown in FIG. 1 through FIG. 3 will be described.

The ignition control operation performed by the ECU 2A and the ionic current detecting operation performed by the resistor R2 are the same as those previously described, and therefore, they will be omitted; the description will be given with attention paid to the operation of only the knocking signal processing circuit 20 which is different from the one described above.

In the enabled/disabled detection determining means 21 (see FIG. 2) of the knocking signal processing circuit 20, the comparator circuit 21a shown in FIG. 3 compares the ionic current detection signal Ei with the reference level Er and issues the comparison result C which indicates the high level for a period of time wherein Ei>Er. The timer processing circuit 21b issues the high level enabled/disabled detection signal F when the comparison result C stays at the high level for the predetermined time τ and removes the period of the noise signal En as the low level period.

Hence, the enabled/disabled detection signal F is associated only with the ionic current detection signal Ei immediately after ignition and it turns into a pulse signal indicative of the high level, which means the readiness for detecting knocking.

The gate circuit 22 is opened by the enabled/disabled detection signal F for the period which corresponds only to the ionic current detection signal Ei after combustion; it supplies the ionic current detection signal Ei to the filtering means 23.

While the enabled/disabled detection signal F stays at the low level, the gate circuit 22 is shut off to prohibit the input of the ionic current detection signal Ei to the filtering means 23.

Hence, the noise signal En produced at the rise of the ignition signal P, i.e. at the time of energizing the ignition coil 4, and at the fall thereof, i.e. at the time of de-energizing the ignition coil 4, is eliminated from the knocking signal K, so that the knocking pulse KP is not affected at all.

Thus, the enabled/disabled detection signal F masks the period over which the noise signal En is produced, enabling the simple circuit configuration of the knocking signal processing circuit 20 to attain improved signal-to-noise ratio of the knocking pulse KP. This makes it possible for the ECU 2A to determine the occurrence of knocking with high reliability according to the highly accurate knocking pulse KP without adding to the load on the arithmetic processing thereof.

The ECU 2A is also able to determine the intensity of knocking for each ignition cycle according to the count and the duration of the knocking pulse KP so as to correct the ignition timing.

Second Embodiment

In the first embodiment above, the knocking pulse KP has been supplied as the knocking information to the ECU 2A; however, the knocking signal K may be supplied instead.

In such a case, the ECU 2A would determine the intensity of knocking for each ignition cycle according mainly to the duration and peak value of the knocking signal K.

Likewise, although the waveform shaping means 24 for providing the knocking pulse KP has been installed in the knocking signal processing circuit 20 in the first embodiment, it may alternatively be installed in the ECU 2A.

Third Embodiment

No particular description has been given to the application of the enabled/disabled detection signal F supplied to the ECU 2A; the enabled/disabled detection signal F may be employed as an enable signal for judging a misfire in the ECU 2A.

Fourth Embodiment

Figure 5:
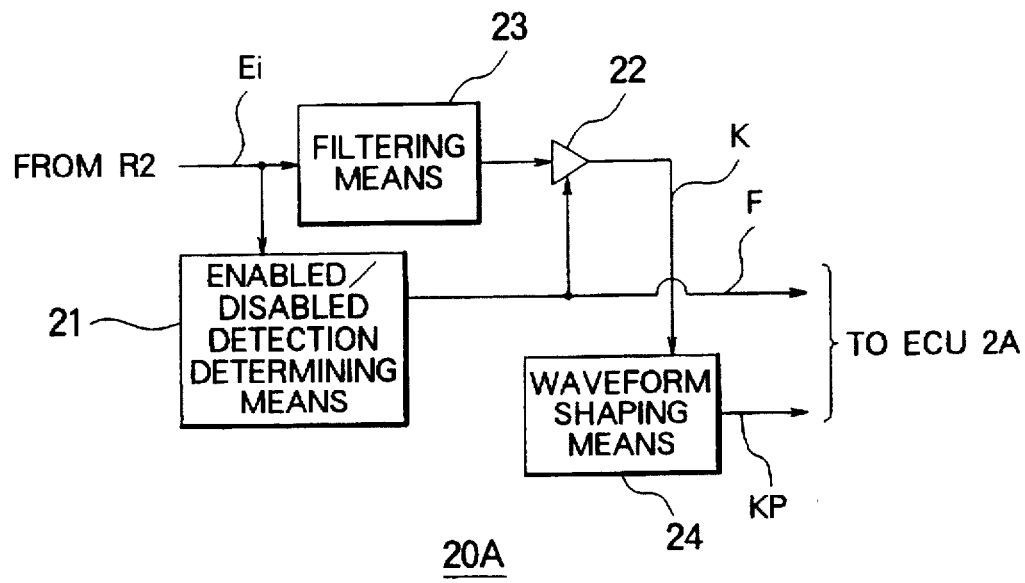
FIG. 5 is a functional block diagram illustrating a specific configuration example of the knocking signal processing circuit according to a fourth embodiment of the present invention.

In the first embodiment, the gate circuit 22 for rendering the knocking signal K effective or ineffective has been installed between the ionic current detecting circuit which includes the resistor R2 and the filtering means 23; however, the gate circuit 22 may alternatively be installed at the output end of the filtering means 23 as shown in FIG. 5.

FIG. 5 is a block diagram illustrating a knocking signal processing circuit 20A according to a fourth embodiment of the invention.

In FIG. 5, the gate circuit 22 in the knocking signal processing circuit 20A responds to the enabled/disabled detection signal F and selectively supplies the knocking signal K received from the filtering means 23 to a waveform shaping circuit 24.

More specifically, when the enabled/disabled detection signal F indicates an enabled/disabled detection state, i.e. high level, the gate circuit 22 allows the knocking signal K to pass through and renders it effective; when the enabled/disabled detection signal F indicates a disabled detection state, i.e. low level, the gate circuit 22 prevents the knocking signal K from passing through and renders it ineffective.

This embodiment is also able to remove the period over which the noise signal En shown in FIG. 4 is produced from the enabled detection period, thus providing the same operation and advantage as described above.

Fifth Embodiment

Figure 6:
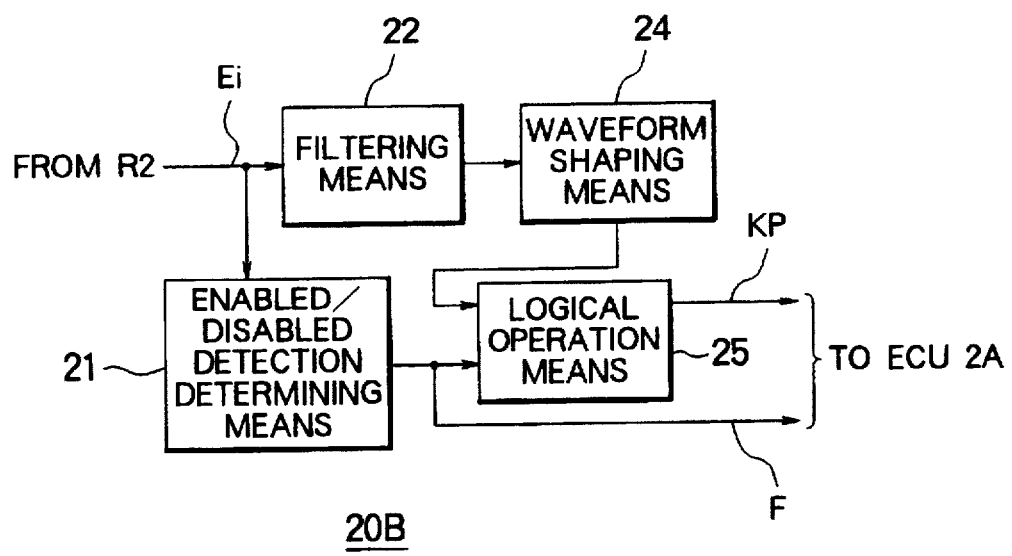
FIG. 6 is a functional block diagram illustrating a specific configuration example of the knocking signal processing circuit according to a fifth embodiment of the present invention.

In the preceding fourth embodiment, the gate circuit 22 has been employed for the knocking signal switching means; as an alternative, however, a logical operation means may be used as shown in FIG. 6.

FIG. 6 is a block diagram illustrating knocking signal processing circuit 20B according to a fifth embodiment of the invention.

In FIG. 6, a logical operation means 25 in the knocking signal processing circuit 20B is provided at the output end of the waveform shaping circuit 24; it outputs the logical product of the waveform-shaped knocking signal and the enabled/disabled detection signal F as the final knocking pulse KP.

In this embodiment also, the noise signal En shown in FIG. 4 does not affect the knocking pulse KP, thus providing the same operation and advantage described above.

Sixth Embodiment

Figure 7:
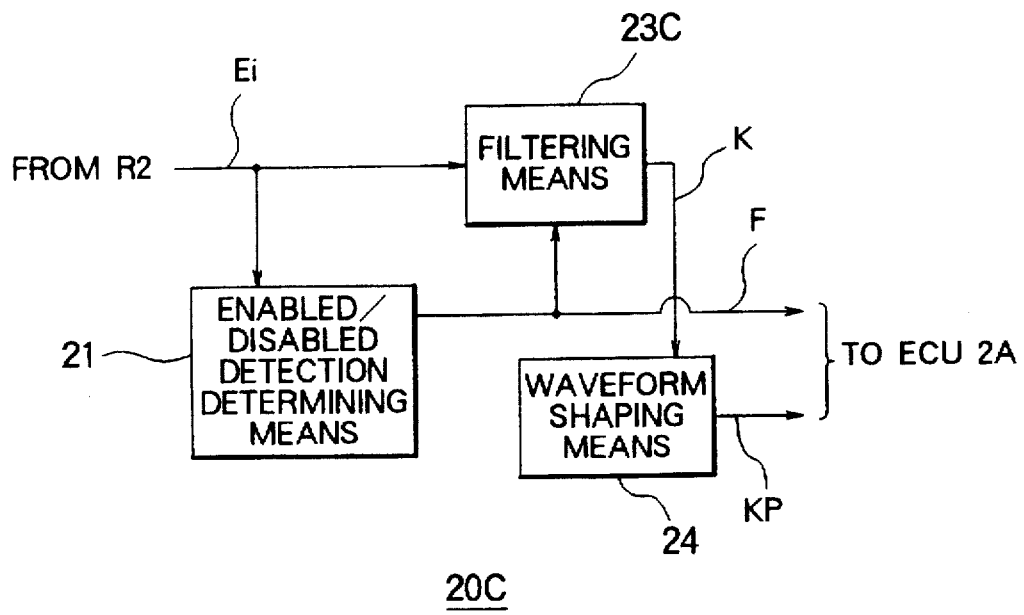
FIG. 7 is a functional block diagram illustrating a specific configuration example of the knocking signal processing circuit according to a sixth embodiment of the present invention.

In the preceding fifth embodiment, the logical operation means 25 has been used as the knocking signal switching means; the logical operation means, however, may be replaced by a filtering means 23C which switches the output characteristic in response to the enabled/disabled detection signal F as shown in FIG. 7.

FIG. 7 is a block diagram illustrating a knocking signal processing circuit 20C according to a sixth embodiment of the invention.

In FIG. 7, the filtering means 23C in the knocking signal processing circuit 20C includes a filtering characteristic changing means which functions as the knocking signal switching means; for example, it selectively outputs the knocking signal K while the enabled/disabled detection signal F is at the high level.

Figure 8:
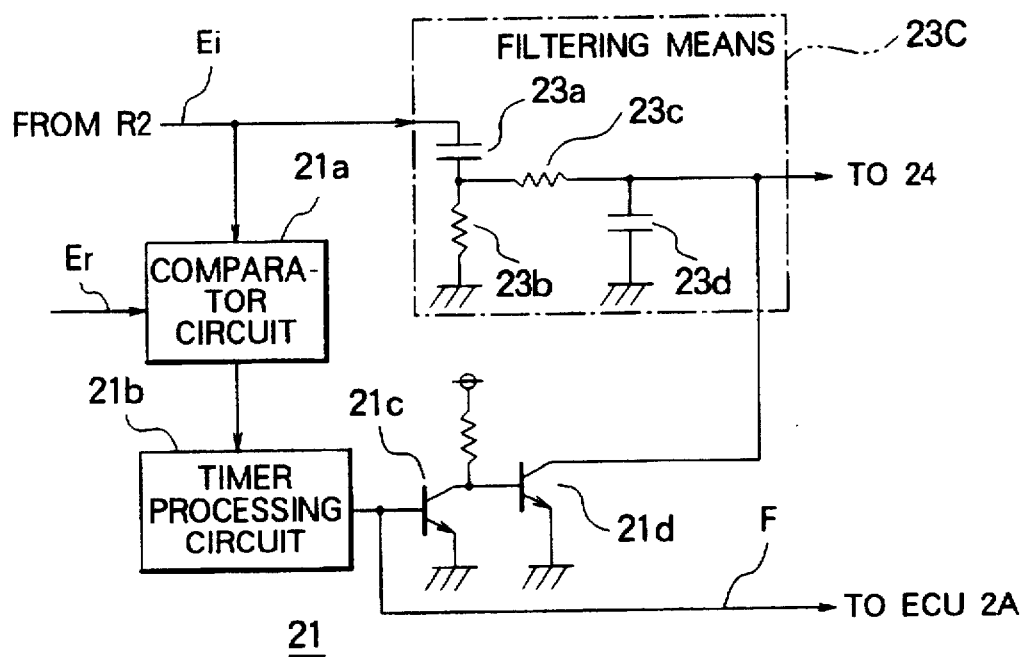
FIG. 8 is a circuit block diagram illustrative of specific examples of an enabled/disabled detection determining means and filtering means shown in FIG. 7.

FIG. 8 is a circuit configuration diagram showing specific examples of the enabled/disabled detection determining means 21 and the filtering means 23C shown in FIG. 7.

In FIG. 8, emitter-grounded NPN transistors 21c and 21d are installed at the output end of the enabled/disabled detection determining means 21 composed of a comparator circuit 21a and a timer processing circuit 21b.

The enabled/disabled detection signal F is applied to the base of the NPN transistor 21c in the front stage, the collector of the NPN transistor 21c is connected to the base of the NPN transistor 21d in the subsequent stage, and the collector of the NPN transistor 21d is connected to the output end of the filtering means 23C so as to switch the output characteristic of the filtering means 23C.

The filtering means 23C includes a high-pass filter comprised of a capacitor 23a and a resistor 23b, and a low-pass filter comprised of a resistor 23c and a capacitor 23d.

The high-pass filter composed of 23a and 23b in the front stage removes a DC component from the ionic current detection signal Ei, whereas the low-pass filter comprised of 23c and 23d removes noises from the ionic current detection signal Ei so as to allow only knocking vibration to pass through.

In this embodiment, during the period in which the enabled/disabled detection signal F stays at the low level, i.e. knocking detection is disabled, the NPN transistor 21c is OFF, whereas the NPN transistor 21d is ON; therefore, the output of the low-pass filter composed of 23c and 23d is grounded via the NPN transistor 21d.

Hence, the output signal of the filtering means 23C is masked by being held at the ground level, thus preventing the knocking signal K from being sent to a waveform shaping means 24 in the subsequent stage circuit.

During the period in which the enabled/disabled detection signal F is at the high level, i.e. knocking detection is enabled, the NPN transistor 21c is ON, whereas the NPN transistor 21d is OFF; therefore, the filtering means 23C issues the knocking signal K and the waveform shaping means 24 supplies the knocking pulse KP to the ECU 2A.

Thus, the knocking signal K is masked to prevent the noise signal En from affecting the subsequent stage circuit during the period in which knocking detection is disabled, whereas the knocking signal K is output only during the period in which knocking detection is enabled. Therefore, the noise signal En shown in FIG. 4 does not affect the knocking pulse KP, resulting in improved signal-to-noise ratio for the detection of knocking.

If the knocking signal processing circuit 20C does not include the waveform shaping means 24, then the knocking signal K from the filtering means 23C is directly supplied to the ECU 2A as described previously.

Seventh Embodiment

In the foregoing sixth embodiment, in response to the enabled/disabled detection signal F, the knocking signal K has been masked during the period in which the detection of knocking is disabled to prevent the knocking signal K from being output from the filtering means 23C; alternatively, however, the output level of the filtering means 23C may be raised or lowered in response to the enabled/disabled detection signal F.

Figure 9:
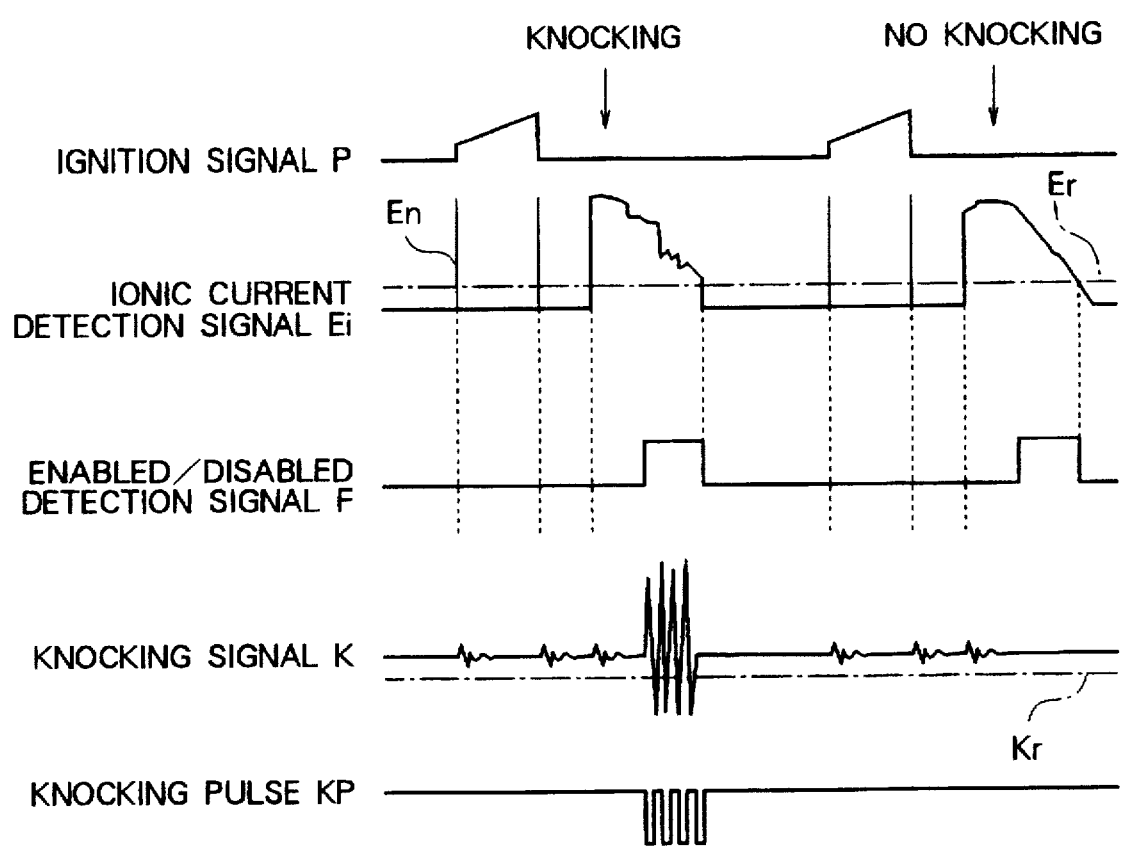
FIG. 9 is a timing chart for describing the operation of a seventh embodiment of the present invention.

FIG. 9 is a timing chart for describing the operation of a seventh embodiment of the present invention wherein the output gain of the filtering means 23C is made variable. The block diagram of the seventh embodiment of the invention is given in FIG. 7.

In this embodiment, the filtering characteristic changing means in the filtering means 23C lowers the output gain to a waveform shaping level Kr or less of the waveform shaping means 24 during the period in which the enabled/disabled detection signal F is at the low level, whereas it raises the output gain to a normal value during the period in which the enabled/disabled detection signal F is at the high level.

More specifically, the filtering means 23C changes the filtering characteristic in the period wherein the enabled/disabled detection signal F is at the low level, i.e. the detection of knocking is disabled, and it lowers the level of the output signal, namely, the knocking signal K, of the frequency band corresponding to the knocking to the waveform shaping level Kr or less as illustrated in FIG. 9.

During the period in which the enabled/disabled detection signal F is at the high level, i.e. the detection of knocking is enabled, the filtering means 23C outputs the knocking signal K at the normal high output gain, so that the waveform shaping means 24 supplies the knocking pulse KP to the ECU 2A.

Thus, during the period wherein the detection of knocking is disabled, the output level of the knocking signal K is lowered to remove the influences exerted by the noise signal En on the subsequent stage circuit, and the knocking signal K of the normal level is output only during the period in which the detection of knocking is enabled. Therefore, the noise signal En does not affect the knocking pulse KP, permitting improved signal-to-noise ratio of the detection of knocking.

Eighth Embodiment

In the foregoing first through seventh embodiments, no special consideration has been given to the failures such as disconnection and ground fault of the input circuit of the ECU which includes the knocking signal processing circuits 20, 20A through 20C, and the signal path connecting the knocking signal processing circuits with the ECU; an arrangement may be made to detect the failures of the input circuit including the knocking signal processing circuit and the signal path by referring to the input level of the knocking pulse KP.

Figure 10:
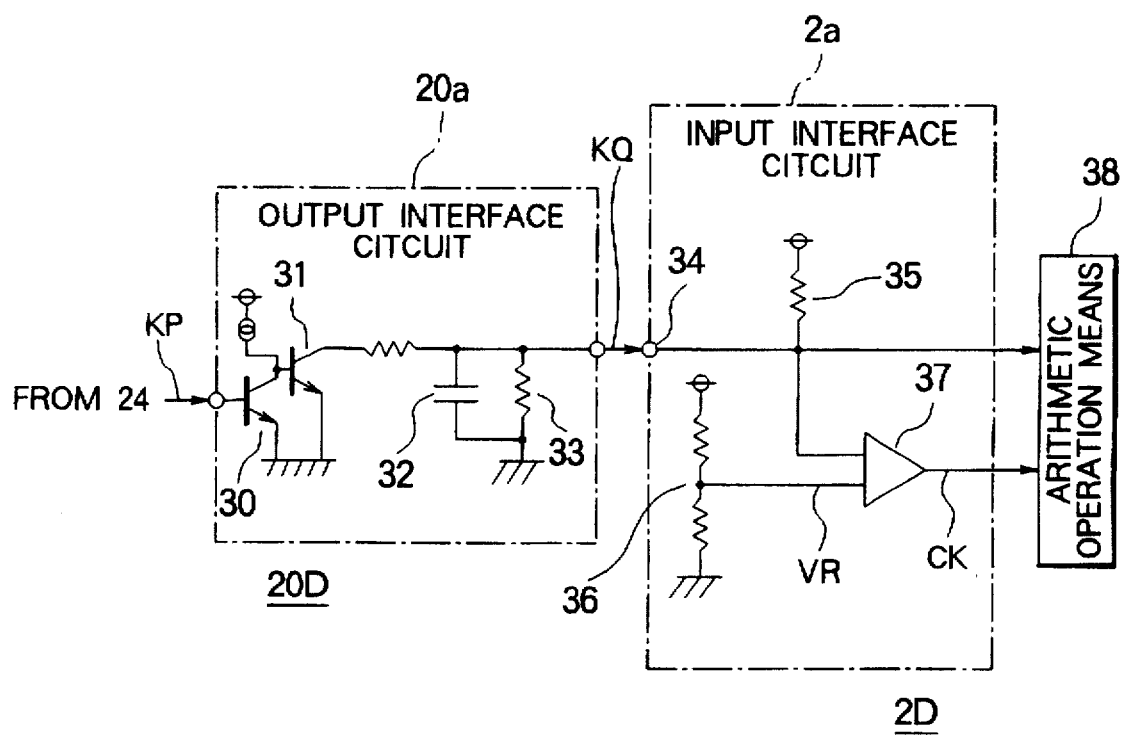
FIG. 10 is a circuit configuration diagram illustrating specific examples of the knocking signal processing circuit and an ECU according to an eighth embodiment of the present invention.

FIG. 10 is a circuit block diagram illustrative of the essential section of an eighth embodiment of the present invention wherein a circuit failure determining means is provided in an ECU 2D; it specifically shows an output interface circuit 20a of a knocking signal processing circuit 20D and an input interface circuit 2a of the ECU 2D. The configuration not shown is as illustrated in FIG. 1 through FIG. 3.

In FIG. 10, the knocking signal processing circuit 20D includes the output interface circuit 20a inserted at the output end of a waveform shaping means 24; it supplies a knocking pulse KQ via the output interface circuit 20a to the ECU 2D.

The ECU 2D detects failures including disconnection of the input circuit according to the knocking pulse KQ received via the input interface circuit 2a.

The output interface circuit 20a includes two-stage, emitter-grounded NPN transistors 30 and 31, a capacitor 32 inserted between the collector of the NPN transistor 31 and the ground, and a resistor 33 connected in parallel to the capacitor 32.

The knocking pulse KP shown in FIG. 9 is applied to the base of the NPN transistor 30; the output of the collector of the NPN transistor 31 fixes the output level of the knocking pulse KQ at the high level when no knocking takes place.

The input interface circuit 2a includes: a resistor 35 inserted between an input terminal 34 of the knocking pulse KQ and the power supply of the ECU 2D; a reference voltage generating circuit 36 composed of a pair of voltage dividing resistors which generate a reference voltage VR between the high level of the knocking pulse KQ and the line voltage; and a comparator circuit 37 which compares the voltage at the input terminal 34 with the reference voltage VR.

The ECU 2D is equipped with an arithmetic operation means 38 to which the voltage at the input terminal 34 and a comparison result CK given by the comparator circuit 37 are supplied.

The arithmetic operation means 38 may receive a crank angle signal SGT, the operational state signals from various sensors 3, an ionic current detection signal Ei, an enabled/disabled detection signal F, the knocking pulse KP, etc. in addition to the voltage at the input terminal 34 and the comparison result CK provided by the comparator circuit 37.

The arithmetic operation means 38 is provided with the foregoing internal-combustion engine control function, and it also includes the circuit failure determining means; it determines a failure or the soundness of the input circuit of the ECU 2D including the knocking signal processing circuit 20D and the signal path thereof according to the voltage at the input terminal 34, i.e. the knocking pulse KQ, and the comparison result CK.

When the input circuit of the ECU 2D including the signal path is sound, the voltage of the collector of the NPN transistor 31, that is, the voltage at the input terminal 34, is set to a value lower than the line voltage because of the voltage dividing operation by the resistor 35 in the input interface circuit 2a and the resistor 33 in the output interface circuit 20a.

Thus, the high level voltage of the knocking pulse KQ when the NPN transistor 31 is OFF is divided by the resistors 33 and 35 and drops to a value lower than the line voltage.

The low level voltage of the knocking pulse KQ when the NPN transistor 31 is ON is divided by the resistance including the ON resistance of the NPN transistor 31 and the resistor 35 and rises to a voltage higher than the ground potential.

If the input circuit has incurred a disconnection failure, the voltage at the input terminal 34 connected to the power supply of the ECU via the resistor 35 is set to the line voltage.

The operation of detecting a circuit failure according to the eighth embodiment of the invention shown in FIG. 10 will now be described specifically.

The arithmetic operation means 38 is capable of determining a circuit failure according to the operational state of the internal-combustion engine and the enabled/disabled detection signal F.

If, for example, the fuel to the internal-combustion engine has been cut off, then the ionic current detection signal Ei is not output; therefore, the enabled/disabled detection signal F should indicate the low level, which means the detection of knocking is disabled.

If, however, the enabled/disabled detection signal F always indicate the high level, which means the detection of knocking is enabled, when the fuel has been cut off, then the arithmetic operation means 38 in the ECU 2D is able to determine that a failure has occurred in the input circuit which includes the ionic current detecting circuit and the knocking signal processing circuit 20.

Likewise, when the operational state of the internal-combustion engine is stable with less fluctuation in rotation, the enabled/disabled detection signal F should indicate the high level, which means that the detection of knocking is enabled, for each control cycle.

If, however, the enabled/disabled detection signal F always indicates the low level, which means that the detection of knocking is disabled, then the arithmetic operation means 38 is able to determine that the input circuit has incurred a failure.

Thus, the arithmetic operation means 38 in the ECU 2D is able to decide that it cannot accurately determine a failure of the input circuit, that is, it cannot obtain accurate ionic current detection signal Ei or the knocking pulse KP when the enabled/disabled detection signal F indicates the low level during a period in which it should indicate the high level, or when the enabled/disabled detection signal F indicates the high level during a period in which it should indicate the low level.

If a failure is detected in the foregoing states, then the ECU 2D decides that the ionic current detection signal Ei and the knocking pulse KP are not reliable and it interrupts the control correction for restraining noises which is based on the knocking pulse KQ, and triggers an alarm or the like, not shown, to announce the occurrence of the fault.

If the signal conductor connecting the knocking signal processing circuit 20D with the ECU 2D is disconnected, then the voltage at the input terminal 34 of the ECU 2D indicates the line voltage at all times regardless of the presence of the knocking pulse KQ.

At this time, the comparator circuit 37 compares the voltage at the input terminal 34 with the reference voltage VR, which is higher than the high level of the knocking pulse KQ but lower than the line voltage, and if it decides that the voltage at the input terminal 34 exceeds the reference voltage VR, then it sets the comparison result CK to the high level.

Thus, the arithmetic operation means 38 recognizes that the voltage at the input terminal 34 has risen to the line voltage and it is cable to easily and positively determine the disconnection failure state of the input circuit, i.e. the state in which no knocking pulse KQ is obtained.

When the aforesaid disconnection failure has been detected, the detection of knocking is disabled; therefore, a high priority is given to the safety, taking the possibility of the occurrence of knocking into account. This enables the arithmetic operation means 38 to delay the ignition timing to suppress the knocking.

Thus, the arithmetic operation means 38 in the ECU 2D is capable of determining a failure of the input circuit of the ECU 2D according to at least one of the enabled/disabled detection signal F and the knocking pulse KQ.

Ninth Embodiment

In the eighth embodiment, the disconnection of the input circuit has been detected by the rise of the voltage at the input terminal 34 to the line voltage; the ground fault of the input circuit may be detected by the drop of the voltage at the input terminal 34 to the ground potential.

In such a case, the reference voltage generating circuit 36 in the input interface circuit 2a generates a reference voltage between the low level voltage of the knocking pulse KQ and the ground potential, and the comparator circuit 37 outputs the comparison result CK of high level when the voltage at the input terminal 34 drops to the reference voltage or less.

As an alternative, two lines of reference voltages and comparator circuits may be provided to cover both disconnection failure and ground fault so that both disconnection failure and ground fault may be determined.

In such a case, the comparator circuit 37 may be constructed by a window comparator so as to output the comparison result CK of high level if a deviation from the range defined by an upper limit reference voltage value and a lower limit reference voltage value takes place.

Tenth Embodiment

In the above eighth embodiment, the circuit failures have been detected according to the operational state signals and the enabled/disabled detection signal F. Alternatively, however, the circuit failures may be detected according to the enabled/disabled detection signal F and the knocking pulse KQ or KP, or the circuit failures may be detected according only to the enabled/disabled detection signal F.

For example, it can be determined that the knocking signal processing circuit 20 or 20A to 20D has failed if the knocking pulse KQ is generated despite that the enabled/disabled detection signal F indicates the low level, which means that the detection of knocking is disabled, of if the enabled/disabled detection signal F is not received for a predetermined period of time.

Eleventh Embodiment

In the first through tenth embodiments described above, the example has been taken in which the high voltage for ignition is distributed to each cylinder; however, low voltage may be distributed, and it is obvious that the present invention can also be applied to group ignition wherein ignition is performed for each group of cylinders.

What is claimed is:

1. A combustion state detecting apparatus for an internal-combustion engine, comprising:

an ignition coil for generating high voltage for ignition;

a spark plug for igniting a fuel-air mixture in a cylinder of the internal-combustion engine by discharging under the application of the high voltage for ignition;

an ionic current detecting circuit which includes biasing means for applying a bias voltage to the spark plug and detects, as an ionic current detection signal, the ionic current corresponding to the quantity of ions produced in the cylinder immediately after the combustion of the fuel-air mixture;

a knocking signal processing circuit which generates a knocking signal indicative of the occurring state of knocking in the internal-combustion engine according to the ionic current detection signal; and an ECU which computes control parameters for the internal-combustion engine and also detects the combustion state at the spark plug according to the ionic current detection signal and the knocking signal;

wherein the knocking signal processing circuit includes;

filtering means for extracting a frequency band, which corresponds to the knocking of the internal-combustion engine, from the ionic current detection signal, an enabled/disabled detection determining means for issuing an enabled/disabled detection signal indicative of whether the detection of the knocking signal is enabled or disabled according to the ionic current detection signal, and knocking signal switching means for rendering the output of the knocking signal effective only when the enabled/disabled detection signal indicates an enabled detection state.

2. A combustion state detecting apparatus for an internal-combustion engine according to claim 1, wherein the enabled/disabled detection determining means includes:

a comparator circuit for comparing the ionic current detection signal with a predetermined reference level; and a timer processing circuit which issues the enabled/ disabled detection signal according to a comparison result given by the comparator circuit when the ionic current detection signal continuously exceeds the reference level for a predetermined time.

3. A combustion state detecting apparatus for an internal-combustion engine according to claim 1, wherein the knocking signal switching means:

comprises a gate circuit inserted between the ionic current detecting means and the filtering means;

supplies the ionic current detection signal to the filtering means when the enabled/disabled detection signal indicates the enabled detection state; and prohibits the input of the ionic current detection signal to the filtering means when the enabled/disabled detection signal indicates a disabled detection state.

4. A combustion state detecting apparatus for an internal-combustion engine according to claim 1, wherein the knocking signal switching means:

comprises a gate circuit provided at the output end of the filtering means;

renders the output of the knocking signal effective when the enabled/disabled detection signal indicates the enabled detection state; and prohibits the output of the knocking signal when the enabled/disabled detection signal indicates the disabled detection state.

5. A combustion state detecting apparatus for an internal-combustion engine according to claim 1, wherein the knocking signal switching means:

comprises a logical operation means provided at the output end of the filtering means; and outputs the logical product of the knocking signal and the enabled/disabled detection signal as a final knocking signal.

6. A combustion state detecting apparatus for an internal-combustion engine according to claim 1, wherein the knocking signal switching means:

comprises filtering characteristic changing means provided in the filtering means; and lowers the output level of the frequency band which corresponds to knocking when the enabled/disabled detection signal indicates the disabled detection state.

7. A combustion state detecting apparatus for an internal-combustion engine according to claim 1, wherein:

the knocking signal processing circuit includes waveform shaping means provided at the output end of the filtering means; and the waveform shaping means compares the knocking signal with a predetermined waveform shaping level to turn it into a knocking pulse which is applied to the ECU.

8. A combustion state detecting apparatus for an internal-combustion engine according to claim 7, wherein:

the ECU includes circuit failure determining means which determines a failure of an input circuit of the ECU according to at least one of the enabled/disabled detection signal and the knocking pulse; and the input circuit includes the knocking signal processing circuit and a signal path connecting the knocking signal processing circuit and the ECU.

9. A combustion state detecting apparatus for an internal-combustion engine according to claim 8, wherein:

the knocking signal processing circuit includes an output interface circuit for outputting the knocking pulse at a voltage level between the line voltage of the ECU and the ground;

the ECU includes an input interface circuit having an input terminal to which the knocking pulse is applied;

the voltage of the input terminal is set to a predetermined level which is different from the voltage level of the knocking pulse if the input circuit has failed; and the circuit failure determining means determines at least one of a disconnection failure and a ground fault of the input circuit according to the voltage at the input terminal.

10. A combustion state detecting apparatus for an internal-combustion engine according to claim 9, wherein the input interface circuit includes:

a resistor inserted between the input terminal and the power supply of the ECU;

a reference voltage generating circuit for generating a reference voltage between the high level voltage of the knocking pulse and the line voltage; and a comparator circuit for comparing the voltage at the input terminal with the reference voltage;

the voltage at the input terminal being set to a value lower than the line voltage when the input circuit is sound, whereas it is set to the line voltage if the input circuit has incurred a disconnection failure, and the circuit failure determining means determining the disconnection failure of the input circuit according to the voltage at the input terminal and a comparison result given by the comparator circuit.

11. A combustion state detecting apparatus for an internal-combustion engine according to claim 9, wherein:

the output interface circuit includes a resistor inserted between the output terminal of the knocking pulse and the ground;

the input interface circuit includes;

a reference voltage generating circuit for generating a reference voltage between the low level voltage of the knocking pulse and the ground, and a comparator circuit for comparing the voltage at the input terminal with the reference voltage;

the voltage at the input terminal is set to a value higher than the potential of the ground when the input circuit is sound, whereas it is set to the potential of the ground if the input circuit has incurred a ground fault; and the circuit failure determining means determines the ground fault of the input circuit according to the voltage at the input terminal and a comparison result given by the comparator circuit.

12. A combustion state detecting apparatus for an internal-combustion engine according to claim 8, wherein the circuit failure determining means decides that the knocking signal processing circuit has failed if the enabled/disabled detection signal is not received for a predetermined period of time.

* * * * *

UNITED STATES PATENT AND TRADEMARK OFFICE
CERTIFICATE OF CORRECTION

PATENT NO. : 5,785,020
DATED : Jul 28, 1998
INVENTOR(S) : Takahashi, Yasuhiro, et al It is certified that error appears in the above-indentified patent and that said Letters Patent is hereby corrected as shown below:

IN THE CLAIMS:

Claim 1, line 11, change "the" (first occurrence) to --an--;

line 19, change "the" to --a--;

line 23, change "includes;" to --comprises:--;

line 33, delete "the".

Claim 2, line 3, change "includes" to --comprises--.

3. (Amended) A combustion state detecting apparatus for an internal-combustion engine according to Claim 1, wherein the knocking signal switching means <u>comprises</u>:

[comprises] a gate circuit inserted between the ionic current detecting means and the filtering means;

<u>wherein the gate circuit</u> supplies the ionic current detection signal to the filtering means when the enabled/disabled detection signal indicates the enabled detection state[;] <u>,</u> and prohibits [the] input of the ionic current detection signal to the filtering means when the enabled/disabled detection signal

UNITED STATES PATENT AND TRADEMARK OFFICE
CERTIFICATE OF CORRECTION

PATENT NO. : 5,785,020
DATED : Jul 28, 1998
INVENTOR(S) : Takahashi, Yasuhiro, et al It is certified that error appears in the above-indentified patent and that said Letters Patent is hereby corrected as shown below:

indicates a disabled detection state.

4. (Amended) A combustion state detecting apparatus for an internal-combustion engine according to Claim 1, wherein the knocking signal switching means <u>comprises</u>:

[comprises] a gate circuit provided at the output end of the filtering means;

<u>wherein the gate circuit</u> renders the output of the knocking signal effective when the enabled/disabled detection signal indicates the enabled detection state[;] <u>,</u> and prohibits the output of the knocking signal when the enabled/disabled detection signal indicates the disabled detection state.

5. (Amended) A combustion state detecting apparatus for an internal-combustion engine according to Claim 1, wherein the knocking signal switching means <u>comprises</u>:

[comprises] a logical operation means provided at [the] <u>an</u> output end of the filtering means<u>,</u> [;] and outputs [the] <u>a</u> logical product of the knocking signal and the enabled/disabled detection signal as a final knocking signal.

UNITED STATES PATENT AND TRADEMARK OFFICE
CERTIFICATE OF CORRECTION

PATENT NO. : 5,785,020
DATED : Jul. 28, 1998
INVENTOR(S) : Takahashi, Yasuhiro, et al It is certified that error appears in the above-indentified patent and that said Letters Patent is hereby corrected as shown below:

6. (Amended) A combustion state detecting apparatus for an internal-combustion engine according to Claim 1, wherein the knocking signal switching means <u>comprises</u>:

[comprises] filtering characteristic changing means, provided in the filtering means, [; and] <u>for lowering an</u> [lowers the] output level of the frequency band which corresponds to knocking when the enabled/disabled detection signal indicates the disabled detection state.

7. (Amended) A combustion state detecting apparatus for an internal-combustion engine according to Claim 1, wherein:

the knocking signal processing circuit includes waveform shaping means, provided at [the] <u>an</u> output end of the filtering means, [; and the waveform shaping means compares] <u>for comparing</u> the knocking signal with a predetermined waveform shaping level to [turn it into] <u>produce</u> a knocking pulse which is applied to the ECU.

UNITED STATES PATENT AND TRADEMARK OFFICE
CERTIFICATE OF CORRECTION

PATENT NO. : 5,785,020
DATED : Jul. 28, 1998
INVENTOR(S) : Takahashi, Yasuhiro, et al It is certified that error appears in the above-indentified patent and that said Letters Patent is hereby corrected as shown below:

Claim 8, line 6, after "and", insert --wherein--.

Claim 9, line 9, change "the" (first occurrence) to --wherein--;

line 10, change "the" to --a--;

line 11, change "if" to --when--;

line 13, before "the", insert --wherein--.

10. (Amended) A combustion state detecting apparatus for an internal-combustion engine according to Claim 9, wherein the input interface circuit [includes] comprises:

a resistor inserted between the input terminal and [the] a power supply of the ECU;

a reference voltage generating circuit for generating a reference voltage between [the] a high level voltage of the knocking pulse and [the] a line voltage; and a comparator circuit for comparing the voltage at the input terminal with the reference voltage;

the voltage at the input terminal being set to a value lower than the line voltage when the input circuit does not incur a disconnection failure, and [is sound, whereas it] is set to the line voltage when

UNITED STATES PATENT AND TRADEMARK OFFICE
CERTIFICATE OF CORRECTION

PATENT NO. : 5,785,020
DATED : Jul. 28, 1998
INVENTOR(S) : Takahashi, Yasuhiro, et al It is certified that error appears in the above-indentified patent and that said Letters Patent is hereby corrected as shown below:

[if] the input circuit has incurred a disconnection failure, and

<u>wherein</u> the circuit failure determining means [determining] <u>determines</u> the disconnection failure of the input circuit according to the voltage at the input terminal and a comparison result given by the comparator circuit.

11. (Amended) A combustion state detecting apparatus for an internal-combustion engine according to Claim 9, wherein:

the output interface circuit includes a resistor inserted between the output terminal of the knocking pulse and the ground;

UNITED STATES PATENT AND TRADEMARK OFFICE
CERTIFICATE OF CORRECTION

PATENT NO. : 5,785,020
DATED : Jul. 28, 1998
INVENTOR(S) : Takahashi, Yasuhiro, et al It is certified that error appears in the above-indentified patent and that said Letters Patent is hereby corrected as shown below:

the input interface circuit includes;

a reference voltage generating circuit for generating a reference voltage between [the] <u>a</u> low level voltage of the knocking pulse and the ground, and a comparator circuit for comparing the voltage at the input terminal with the reference voltage;

<u>wherein</u> the voltage at the input terminal is set to a value higher than the potential of the ground when the input circuit <u>does not incur a ground fault, and</u> [is sound, whereas it] is set to the potential of the ground [if] <u>when</u> the input circuit has incurred a ground fault; and the circuit failure determining means determines the ground fault of the input circuit according to the voltage at the input terminal and a comparison result given by the comparator circuit.

UNITED STATES PATENT AND TRADEMARK OFFICE
CERTIFICATE OF CORRECTION

PATENT NO. : 5,785,020
DATED : Jul. 28, 1998
INVENTOR(S) : Takahashi, Yasuhiro, et al It is certified that error appears in the above-indentified patent and that said Letters Patent is hereby corrected as shown below:

Claim 12, line 4, change "if" to --when--.

Signed and Sealed this

Second Day of November, 1999

Attest:

Attesting Officer

Q. TODD DICKINSON

Acting Commissioner of Patents and Trademarks